United States Patent
Baird et al.

(10) Patent No.: US 9,088,535 B1
(45) Date of Patent: Jul. 21, 2015

(54) ELECTRONIC MESSAGE RECIPIENT DISPOSITION CHARACTERISTICS

(75) Inventors: Deirdre Baird, Sarasota, FL (US); Brian Medendorp, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 676 days.

(21) Appl. No.: 12/696,474

(22) Filed: Jan. 29, 2010

Related U.S. Application Data

(60) Provisional application No. 61/148,422, filed on Jan. 30, 2009.

(51) Int. Cl.
*G06F 15/16* (2006.01)
*H04L 12/58* (2006.01)
*G06Q 10/10* (2012.01)

(52) U.S. Cl.
CPC .............. *H04L 51/34* (2013.01); *G06Q 10/107* (2013.01)

(58) Field of Classification Search
None
See application file for complete search history.

(56) References Cited

U.S. PATENT DOCUMENTS

| 6,728,714 B1* | 4/2004 | Doganata et al. ................ 1/1 |
| 2003/0231207 A1* | 12/2003 | Huang ........................ 345/752 |
| 2005/0080857 A1* | 4/2005 | Kirsch et al. ................ 709/206 |
| 2007/0011258 A1* | 1/2007 | Khoo ........................... 709/206 |

OTHER PUBLICATIONS

Of Fajman in "An Extensible Message Format for Message Disposition Notifications," RFC 2298, published in Mar. 1998.*

* cited by examiner

*Primary Examiner* — Scott B Christensen
(74) *Attorney, Agent, or Firm* — Cuenot, Forsythe & Kim, LLC

(57) ABSTRACT

A computer implemented method for determining recipient disposition characteristics of an electronic message that was acted upon by an electronic message reader is described. The method includes receiving by a computer system message requests in response to the electronic message reader acting on the electronic message and executing by the computer system one or more rules that compare a value of one or more fields included in the one or more message requests to one or more field values included in the one or more rules.

25 Claims, 2 Drawing Sheets

ELECTRONIC MESSAGE RECIPIENT DISPOSITION CHARACTERISTICS

CLAIM OF PRIORITY

This application claims priority under 35 U.S.C. §119(e) to provisional U.S. Patent Application 61/148,422, filed on Jan. 30, 2009, the entire contents of which are hereby incorporated by reference.

BACKGROUND

An e-mail tracker monitors the delivery of an e-mail to the intended recipient. E-mail trackers use a digitally time-stamped record to monitor the time and date that an e-mail was received or opened, as well the internet protocol ("IP") address of the recipient. Through an e-mail tracker, a sender ascertains whether the intended recipient received the e-mail, or if the intended recipient clicked links included in the e-mail. E-mail trackers also provide the sender of the e-mail with a delivery service notification ("DSN"): a request to the recipient's e-mail server to send the sender of the e-mail a notification about the delivery of an e-mail. The DSN is an e-mail and includes information indicating whether delivery succeeded, failed, was delayed, or whether the recipient's email server was unable to provide a receipt of delivery.

One technique for tracking the delivery characteristics of an electronic message involves the use of seed lists (e.g., a list of decoy email addresses included in a marketing organization's marketing list) to track how an internet service provider ("ISP") handles the electronic message.

For example, a marketing organization sends a large number of potential recipients marketing electronic messages as part of a marketing campaign. These recipients can have various ISP's. Included in the e-mail addresses are seed e-mail addresses, e.g., e-mail addresses of dummy accounts at some or all of the various ISPs. By sending the marketing electronic messages to the seed email addresses, the marketing company tracks whether the targets' ISPs block or deliver the marketing electronic messages.

SUMMARY

However, the seed list fails to provide the marketing company with information regarding how the recipients disposed of the messages but only that the message may have passed though an ISP's filters, etc. Similarly, DSN messages provide a sender of an electronic message with delivery receipt information. However, delivery receipt information also fails to provide the sender of an electronic message with information regarding how the recipient of the electronic message disposes (e.g., whether the electronic message was placed in a spam folder or a personal email folder or whether the electronic message was forwarded) of the electronic message.

Techniques are described herein for providing the sender with information regarding how the recipient disposes of and views the sender's electronic message. For example, message requests are received by a computer system in response to an electronic message reader acting on an electronic message. The computer system executes one or more rules that compare a value of one or more fields included in the one or more message requests to one or more field values included in the one or more rules. The computer system also determines based on execution of the one or more rules one or more recipient disposition characteristics of the electronic message that was acted upon by the electronic message reader.

Implementations may include one or more of the following features. The message requests include hypertext transfer protocol ("HTTP") data message requests, HTTP header message requests and HTTP connection data message requests. The message requests also include one or more HTTP request headers and the one or more fields included in the one or more message requests comprise one or more folder placement fields included in the one or more HTTP request headers.

The execution of the one or more rules causes the computer system to determine whether the electronic message was placed in a spam, a trash or an inbox folder associated with the electronic message reader on a client system or whether the electronic message was forwarded to a recipient. The computer system also generates a list of field values associated with fields specifying electronic message recipient disposition characteristics and executes one or more rules using field values in the generated list to identify recipient disposition characteristics of the electronic message. The computer system further tracks the determined recipient disposition characteristics for a specific electronic message, generates a response message for a client system running the electronic message reader according to the tracked recipient disposition characteristics, and sends the response message to the client system.

The contents of the request message are parsed to identify one or more fields and an associated field value of the one or more fields. Rules are applies to the parsed request message to determine whether the electronic message was viewed by a recipient in the electronic message reader using a preview pane or using a full pane message view, whether the electronic message reader "forward" function or "reply" function or "reply to all" function were initiated by the recipient relative to the electronic message, whether the electronic message reader "report/mark as spam" function or its equivalent was initiated by the recipient relative to the electronic message, and whether the electronic message reader "add to address book/safe sender" function or its equivalent was initiated by the recipient relative to the electronic message.

The rules are ordered and applied to the request message based on an ordering according to one or more combinations of accuracy, specificity, confidence in the outcome of the rule or efficiency. The rules are also grouped according to accuracy, specificity, confidence in the outcome of the rule or efficiency.

DETAILED DESCRIPTION

While, delivery characteristics of an electronic message involve the notification of receipt of delivery of the electronic message (e.g., DSN messages), such delivery characteristics tell the sender little concerning what final disposition was made by the recipient.

Described herein is a class of electronic message notifications, referred to as "recipient disposition characteristics." Recipient disposition characteristics of a transmitted and delivered electronic message (e.g., an e-mail, a text message, and a short message service ("SMS") message) are determined using a tracking server. Recipient disposition characteristics include folder placement (i.e., inbox folder placement, spam folder placement, and trash folder placement) of the electronic message ("tracked electronic message") in a recipient's electronic message reader (e.g., Outlook™ Thunderbird™, Lotus Notes, IPhone™, mobile phone mail, web mail applications, and Blackberry™ message reader). The tracking server determines the recipient disposition characteristics of a tracked electronic message through the receipt of a message request generated by the recipient's electronic message reader and sent to the tracking server. When the recipient of the tracked electronic message opens, clicks, displays or takes some other action with respect to the link, the electronic message reader executes a link embedded in the tracked electronic message. The execution of this link causes a message request to be generated and sent to the tracking server. The message request includes headers (e.g., Hypertext Transfer Protocol Secure ("HTTP") Request Headers) which are parsed by the tracking server. The tracking server applies heuristic rules to the parsed headers to determine the recipient disposition characteristics of the tracked electronic message.

Figure 1:
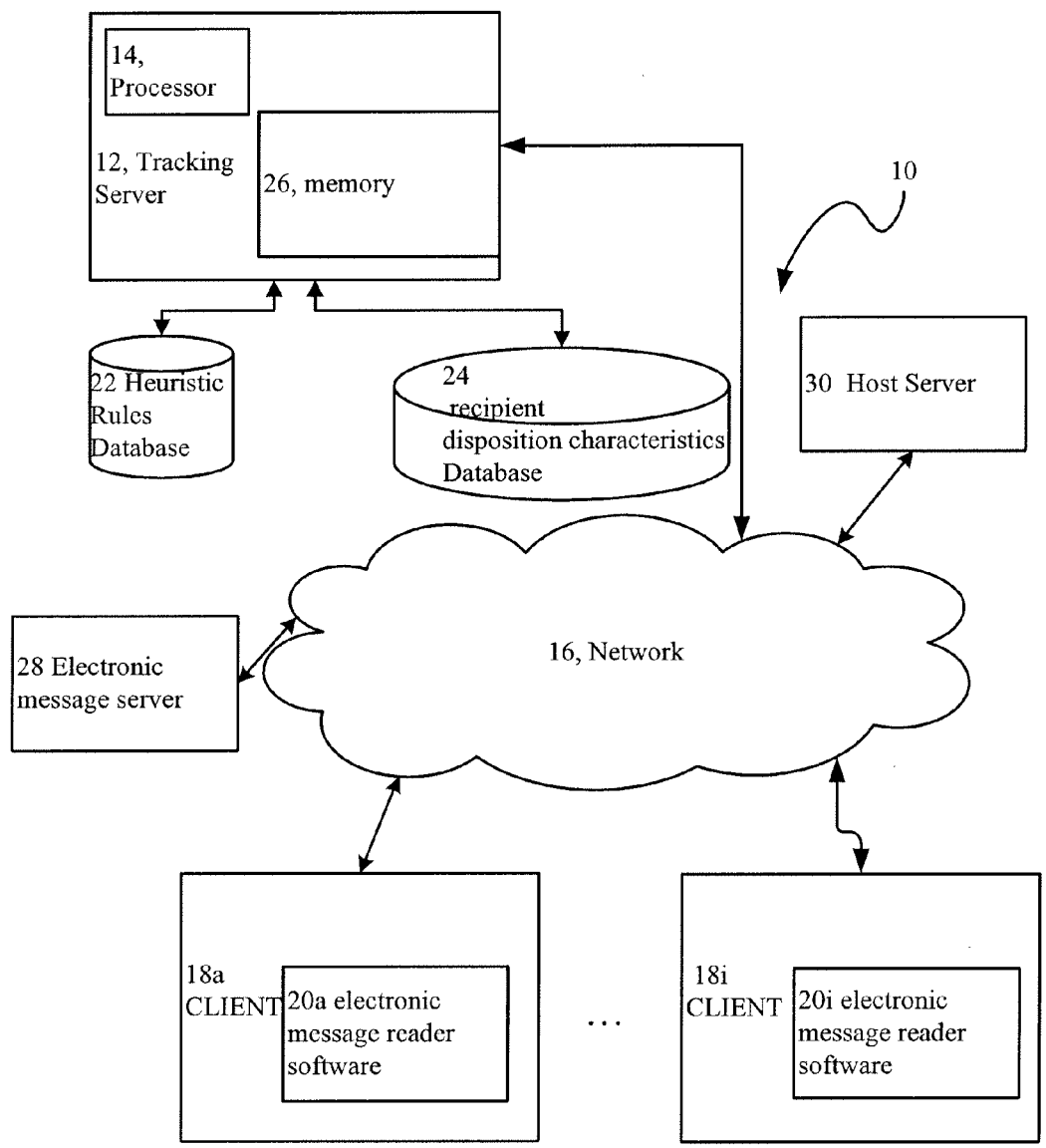
FIG. 1 is a block diagram of a computer system executing electronic message recipient disposition characteristic determination software.

Referring to FIG. 1, a network computer system 10 includes a tracking server 12 executing software to determine recipient disposition characteristics of a tracked electronic message. The networked computer system 10 is connected through a network 16 (e.g., the Internet, an intranet, a virtual private network, a wide area network, a local network, a private network, a wireless fidelity ("WiFi") network), to client systems 18a to 18i executing electronic message reader software 20a to 20i. Client systems 18a to 18i include computing devices and processing devices (e.g., personal digital assistants ("PDAs"), mobile phones, desktop computers, laptop computers, and Blackberries).

The tracking server 12 is connected to a heuristic rules database 22 that stores heuristic rules that are applied to data and headers in received data, including "request" messages and log files. The tracking server 12 is also connected to a recipient disposition characteristics database 24 that stores recipient disposition characteristics of tracked electronic messages. The databases 22 and 24 may run on the same machine as server 12 or on different machines. Databases 22 and 24 may be in different databases, on different machines, or they may be separate schemas in the same database on the same machine. The client systems 18a-18i are connected to the server 12 by the network 16.

The tracking server 12 and client systems 18a-18i communicate directly and indirectly over the network 16 using various communication protocols (e.g., proprietary protocols, Ethernet protocols, and HTTP protocols). The communication is facilitated by any device capable of transmitting data (e.g., client HTTP requests and server responses) to and from other computers, including modems (e.g., dial-up or cable), networks and wireless interfaces.

The tracking server 12 includes a processor 14 and memory 26. The processor 14 executes a recipient disposition characteristics determination process that detects and records recipient disposition characteristics of a sent electronic message that was addressed to a particular electronic message recipient. The process 14 detects "recipient disposition characteristic data" that is what happens to the electronic message at a client application running on client systems 18a-18i by an action initiated by the recipient. For example, the process detects a folder location for where the electronic message was opened, viewed (e.g., an inbox folder, a spam folder and/or a delete mail folder, etc) of a delivered electronic message. The details of the recipient disposition characteristic data for the recipients using client systems 18a-18i are recorded and collated in database 24 to provide a report of the recipient's use of the delivered electronic message. The source of the tracked electronic message includes an electronic message server 28, the tracking server 12 and other computing devices.

When a user of client systems 18a-18i receives a tracked electronic message from the electronic message server 28, the tracked electronic message includes an embedded link for the user to select to download an image or receive additional information. When the user selects the link, client system 18a-18i generates a message request (e.g., a HTTP data request, a HTTP header request and/or a HTTP connection data request, etc.) that is sent to a host server 30 (e.g., a URI host server) over the network 16. The host server 30 is the server that hosts or contains the information requested by virtue of the recipient selecting the link. The message request is also generated by other uses actions, including opening the tracked electronic message and causing an image within the tracked electronic message to be displayed. The message request sent from the client system 18a-18i includes data concerning the recipient disposition characteristics (e.g., the electronic location of the tracked electronic message, placement indicia, and folder identifiers). The message request also includes data concerning the identity of the particular electronic message that is the source of the request to the host server 30, data concerning the identity of the recipient of the electronic message, and data concerning the identity of the original sender of the electronic message, as discussed in further detail below.

In response to the message request, the host server 30 sends a response message to the client system 18a-18i. The response message includes an image file or other data file for display in the client's electronic message reader 20a-20i.

The electronic message reader 20a-20i also generates and sends message requests to the host server 30 independent of a user of the client system 18a-18i executing a clicking action (e.g., via a mouse) of any particular link or icon associated with or contained in the tracked electronic message. The electronic message reader 20a-20i generates message requests when the tracked electronic message includes an embedded image (e.g., a Graphics Interchange Format ("GIF") image or a Joint Photographic Experts Group ("JPEG") image) or other embedded information associated with an address link (e.g., a Uniform Resource Locator ("URL") string or a Uniform Resource Identifier ("URI") string). The electronic message reader 20a-20i sends a request to a device (i.e., the host server 30) associated with the address link for the embedded information so that the electronic message reader 20a-20i is able to display the embedded information.

The message requests from the client system 18a-18i to the host server 30 (or the tracking sever 12) include data representative of the recipient disposition characteristics (e.g., the folder location and/or identification of the client's electronic message reader) of the tracked electronic message. The data is generated in numerous ways, including being embedded in the tracked electronic message when it is sent from the electronic message reader 20a-20i on the client system 18a-18i and being generated by the electronic message reader 20a-20i on the client system 18a-18i in conjunction with data associated with of one or more links of the sent electronic message. The host server 30 stores the message requests and generates a log file with the header information, referrer data and other data (e.g., information indicative of the identity of the sender or the time in which the electronic message was received) included in the message requests. The log file is sent to the tracking server 12, typically on request by the tracking server 12, and the tracking server 12 parses and analyzes the log file to determine the recipient disposition characteristics of the tracked electronic message.

Recipient Disposition Characteristic Data

The tracking server 12 tracks the location and the recipient's disposition of the e-mail message by parsing log files, requested by the tracking server 12 from the host server 30, and/or analyzing the message "requests" that include recipient disposition characteristic data, and applying a rules engine to that recipient disposition characteristic data.

When a sender mails an electronic message to a recipient, the sender has an interest in determining "folder placement" data (e.g., whether that electronic message was placed in the inbox folder or the spam folder of an electronic message reader 20a-20i).

The tracking server's detection of this folder placement data allows the sender to: 1) enhance an interpretation of a particular campaign's performance in the case of a commercial sender, 2) assess whether remedial action is required to ensure more preferential placement in the future, and 3) determine whether an alternative communication with the recipient is likely to be more reliable under the assumption that electronic messages placed in the spam folder or trash folder are less likely to seen and/or acted upon in a timely fashion. Folder placement data also includes information indicative of whether the recipient of the tracked electronic message has placed the tracked electronic message in a personal folder (i.e., a folder that the recipient has custom generated).

The tracking server 12 also determines "screen view" data (i.e., whether the electronic message was viewed by the recipient in the electronic message reader 20a-20i using a preview pane or a full message pane). The detection of this screen view data allows the sender of an electronic message to evaluate the level of recipient engagement with the message and allows the sender to ensure that future message content is organized in such a way to take advantage of the particular view used by the recipient.

The tracking server 12 also determines "message forward" data (i.e., whether the electronic message reader's "forward" function or equivalent was initiated by the recipient of an electronic message) and "message reply" data (i.e., whether the electronic message reader's "reply" function or equivalent was initiated by the recipient of an electronic message). The detection of this message forward and message reply data allows the sender of the electronic message to assess the recipient's engagement with the message and the recipient's evaluation of whether the message content is suitable for the recipient's associates. The tracking server 12 also detects a user's generation of a subsequent electronic message.

The tracking server 12 also determines "spam" data (i.e., whether the electronic message reader's "report/mark as spam" function or its equivalent was initiated by the recipient of an electronic message.) The detection of this spam data allows the sender to assess if the electronic message was not positively received by the recipient and to assess the conditions causing the electronic message to be reported as spam. The spam data also allows the sender to proactively remove the recipient's electronic message address from the sender's mailing list.

The tracking server 12 also determines "mark safe" data (i.e., whether the "add to address book/safe sender" function or its equivalent was initiated by the recipient of the electronic message.) The detection of the mark safe data allows the sender to assess if the electronic message was positively received by the recipient and to assess the conditions that may have resulted in a positive reaction. Through the mark safe data, the sender of the electronic message is notified that the sender's electronic message receives preferential treatment by the recipient, because in electronic message readers 20a-20i electronic messages from senders located in the recipient's address book are automatically displayed with images enabled and/or are marked with a favorable icon.

The electronic message reader 20a-20i on client system 18a-18i receives an electronic message from a sender with a link (e.g., a hyperlink to web pages or images, a URI string or a URL string) embedded in the electronic message. The link is a string representing a "resource" (e.g., an image, a webpage, a script or a type of file that is executed through an HTTP request) that is the target of the link.

The electronic message reader 20a-20i executes the embedded link and generates 34 a message request (e.g., HTTP Request Header) which is sent to the host server 30. The electronic message reader 20a-20i executes the embedded link by initiating an HTTP session with the host server 30 on which the resource identified in the link is requested. The generation of the message request is initiated by user action, including the recipient of the electronic message clicking on link. The message request is also generated through an action performed by the recipient's client system 18a-18i, including the electronic message reader 20a-20i on the client system 18a-18i executing a reference to an inline image in the electronic message. The execution of the reference generates a request for the inline image and this request is sent in a message request to the host server 30, and is generally logged in or stored in a log file on the host server 30 and/or is sent to the tracking server 12.

Figure 2:
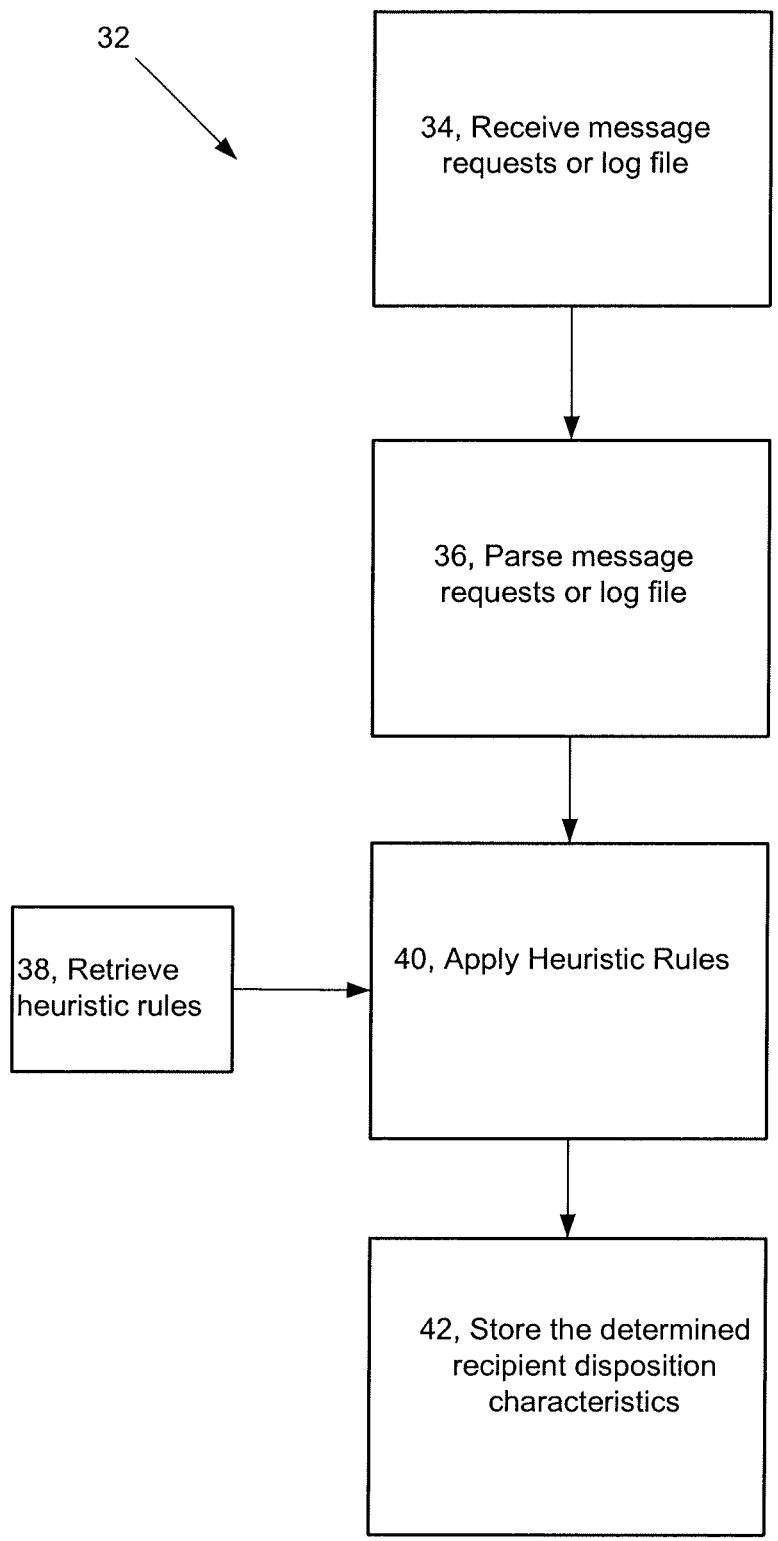
FIG. 2 is a flowchart of processes used by a tracking system.

Referring to FIG. 2, the tracking server 12 determines 32 recipient disposition characteristic data as follows. The tracking server 12 receives 34, either the log files from the host server 30 and/or the message "requests" from the client systems 18a-18i. The message request and the log files include data and headers (e.g., HTTP headers) with information (e.g., data tags) indicative of the recipient disposition characteristics of the tracked electronic message. The headers are separated from the response body of the message request by a blank line. If the tracking server 12 receives the message requests, the header data is stored in a temporary cache for real-time analysis by the tracking server 12. If the host server 30 receives the message requests, the header data is output to a log-file and/or other data storage medium and sent to the tracking server 12 for analysis.

The tracking server 12 parses 36 the received message requests or log files to identify specific header information and referrer data. The tracking server 12 includes a list of header and referrer identifiers and parses the received message requests or log files by comparing characters included in the received message requests and/or log files to the header and referrer identifiers in the list.

The tracking server 12 retrieves 38 the heuristic rules stored in the heuristic rules database 22 (FIG. 1) and applies 40 the heuristic rules to the contents of the parsed messages requests and/or log files. Through the application of the heuristic rules, the tracking server 12 determines the recipient disposition characteristics data of the tracked electronic message and stores 42 the recipient disposition characteristics data in the recipient disposition characteristics database 24 (FIG. 1), as discussed in further detail below.

For receipt of log files from the host server 30, the log files include the message headers for the message requests. Table A below includes HTTP headers included in the message requests as contained in the log files. The headers included in the message request are received by the host server 30 on which the resource referenced by the embedded link is located, or an interim server through which the message request is routed where the interim server is acting as a tracking server 12.

TABLE A

| Header | Description | Example |
|---|---|---|
| Accept | Content-Types that are acceptable | Accept: text/plain |
| Accept-Charset | Character sets that are acceptable | Accept-Charset: iso-8859-5 |
| Accept-Encoding | Acceptable encodings | Accept-Encoding: compress, gzip |
| Accept-Language | Acceptable languages for response | Accept-Language: da |
| Accept-Ranges | Allows the server to indicate its acceptance of range requests for a resource | Accept-Ranges: bytes |
| Authorization | Authentication credentials for HTTP authentication | Authorization: Basic QWxhZGRpbjpvcGVuIHN1c2FtZQ== |
| Cache-Control | Used to specify directives that MUST be obeyed by all caching mechanisms along the request/response chain | Cache-Control: no-cache |
| Connection | What type of connection the user-agent would prefer | Connection: close |
| Cookie | an HTTP cookie previously sent by the server with Set-Cookie (below) | Cookie: $Version=1; UserId=JohnDoe |
| Content-Type | The mime-type of the body of the request (used with POST and PUT requests) | Content-Type: application/x-www-form-urlencoded |
| Date | The date and time that the message was sent | Date: Tue, 15 Nov 1994 08:12:31 GMT |
| Expect | Indicates that particular server behaviors are required by the client | Expect: 100-continue |
| Host | The domain name of the server | Host: en.wikipedia.org |
| If-Match | Perform the action if the client supplied entity matches the same entity on the server. This is mainly for methods like PUT to update a resource if it has not been modified since the user last updated it. | If-Match: "737060cd8c284d8af7ad3082f209582d" |
| If-Modified-Since | Allows a 304 Not Modified to be returned if content is unchanged | If-Modified-Since: Sat, 29 Oct 1994 19:43:31 GMT |
| If-None-Match | Allows a 304 Not Modified to be returned if content is unchanged | If-None-Match: "737060cd8c284d8af7ad3082f209582d" |
| If-Range | If the entity is unchanged, send me the part(s) that I am missing; otherwise, send me the entire new entity | If-Range: "737060cd8c284d8af7ad3082f209582d" |
| If-Unmodified-Since | Send the response if the entity has not been modified since a specific time. | If-Unmodified-Since: Sat, 29 Oct 1994 19:43:31 GMT |
| Max-Forwards | Limit the number of times the message can be forwarded through proxies or gateways. | Max-Forwards: 10 |
| Pragma | Implementation-specific headers that may have various effects anywhere along the request-response chain. | Pragma: no-cache |
| Proxy-Authorization | Authorization credentials for connecting to a proxy. | Proxy-Authorization: Basic QWxhZGRpbjpvcGVuIHN1c2FtZQ== |
| Range | Request part of an entity. | Range: bytes=500-999 |
| Referer | This is the address of the previous web page from which a link to the currently requested page was followed. | Referer: http://en.wikipedia.org/wiki/Main_Page |

TABLE A-continued

| Header | Description | Example |
|---|---|---|
| TE | The transfer encodings the user is willing to accept. | TE: trailers, deflate;q=0.5 |
| Upgrade | Ask the server to upgrade to another protocol. | Upgrade: HTTP/2.0, SHTTP/1.3, IRC/6.9, RTA/x11 |
| User-Agent | The user agent string of the user agent | User-Agent: Mozilla/5.0 (Linux; X11; UTF-8) |
| Via | Informs the server of proxies through which the request was sent. | Via: 1.0 fred, 1.1 nowhere.com (Apache/1.1) |
| Warn | A general warning about possible problems with the entity body. | Warn: 199 Miscellaneous warning |

Heuristic Rules

The heuristic rules include a heuristic rule for determining folder placement data, a heuristic rule for determining screen view data, a heuristic rule for determining message forward data and message reply data, a heuristic rule for determining spam data, and a heuristic rule for determining mark safe data. The tracking server 12 groups the heuristic rules into heuristic rule groups. Dependent upon the objective and interest of the entity analyzing the data, one or more heuristic rule groups and one or more rules within these rule groups are applied to the data and headers included in the message request. For example, if folder placement is of interest, the heuristic rule groups and rules within the heuristic rule groups that determine folder placement data are executed.

The heuristic rules are ordered for execution both within a heuristic rule group and across heuristic rule groups based on one or more combinations of accuracy, specificity, efficiency, and confidence in the outcome of the rule. The heuristic rule groups and rules within a heuristic rule group with a higher level of specificity are ordered to be executed first by the recipient disposition characteristic determination process 14 and are set to overwrite other rules with a lesser degree of specificity. Rules with lesser degrees of specificity are ordered to be executed subsequent to rules with higher degrees of specificity and are ordered to run as default rules that are overwritten by rules with a higher level of specificity.

Additionally, to optimize speed and efficiency of the tracking server 12, the rule groups and rules within the rule groups that have the highest number of incidences (e.g., hits) within a sample data set are ordered to run before those rule groups and rules with a lower number of incidences. Upon the detection of a predefined recipient disposition characteristic (e.g., folder placement), the tracking server 12 stops executing rules against data and headers included in the message request.

The heuristic rules include instructions to compare one or more characters included in the headers and data of a message request (e.g., field values included in the message request) to predefined recipient disposition characteristics, including Folder Placement="Inbox" and Folder Placement="Spam Folder" or a combination of recipient disposition characteristics, including Folder Placement="Inbox" and Screen View="Full Message". The heuristic rules perform exact matches, substring matches, and regular expressions matches (or a combination of the foregoing matches) between all or a portion of the data and headers included in the message request and the predefined recipient disposition characteristics.

The heuristic rules are constructed taking into consideration data derived from known characteristics of a particular electronic message reader 20a-20i (e.g., some electronic message readers 20a-20i provide a full message screen view and other electronic message readers 20a-20i provide a preview pane screen view). The heuristic rules are also constructed using data derived from empirical characteristics (e.g., data derived from interactions with electronic messages), including a person logging into an online electronic message reader 20a-20i (e.g., Yahoo's Email Reader), opening an electronic message that had been placed in the Inbox Folder of the electronic message reader 20a-20i and comparing the resultant HTTP Request Header to a HT Header generated when the electronic message is placed in the Spam Folder of the electronic message reader 20a-20i. Thus, heuristic rules are also constructed using empirical characteristic data.

The heuristic rules are also constructed using assumed and logic patterns derived from data analysis of message requests. A sample set of data and headers included in message requests are analyzed to identify common patterns and to determine variations in the arguments associated with the header. The "folder=" argument included in the "Referrer" header is analyzed by the tracking sever 12 and a list of the arguments (e.g., field values associated with the Referrer header), including "folder=inbox", "folder=spam" and "folder=trash", associated with the Referrer header are generated. The tracking server 12 generates heuristic rules based on the determined arguments (e.g., If header="Referrer" header and folder="spam," then electronic message has been placed in the spam folder.) In addition to the generation of rules to determine the recipient disposition characteristics of electronic messages, rules are also generated to determine the identity of the original sender of the electronic message. These rules are referred to as identity rules. Identity rules are also generated using data and headers included in the message request. The generated heuristic rules include the rules included in Table B, below.

TABLE B

| Characteristic/ Condition and Outcome | HTTP Header field analyzed | Instruction/Heuristic Rule |
|---|---|---|
| Folder Placement = "Inbox" | Referer | Includes an Argument equal to one or more of the following: fid=inbox folderid=00000000-0000-0000-0000-000000000001 msgid=inboxdelim box=inbox fn=inbox |

TABLE B-continued

| Characteristic/ Condition and Outcome | HTTP Header field analyzed | Instruction/Heuristic Rule |
|---|---|---|
| Folder Placement = "Spam Folder" | Referer | Referer includes an Argument equal to one or more of the following:<br>folder=inbox<br>mail_folder=inbox<br>msgvw=inbox<br>folder=sf_inbox<br>fid=%2540b%2540bulk<br>folderid=00000000-0000-0000-0000-000000000005<br>msgid=spamdelim<br>folder=Screened%20Mail<br>folder=mailguard<br>mail_folder=inbox.spamverdacht<br>foldername=/junk%20mail<br>mailbox=bulk |
| Folder Placement = "Trash" | Referer | Referer includes an Argument equal to one or more of the following:<br>fid=trash<br>folder=trash<br>folderid=00000000-0000-0000-0000-000000000002<br>folder=inbox.trash<br>foldername=/deleted%20items<br>mailbox=inbox.deleted<br>mailbox=trash<br>fid=deleted+items |
| Screen View = "Full Message" | Referer + Host | Referer includes a (Path equal to:<br>*popout.jsp)<br>AND<br>Host (Or Referer) includes a Domain equal to:<br>*/earthlink.net) |
| Screen View = "Full Message" | User Agent | User Agent includes a string equal to any of the following:<br>Windows CE<br>Blackberry |
| Screen View = "Full Message" | User Agent + Referer | Referer = " " (blank)<br>AND<br>User Agent includes a string equal to any of the following:<br>AOL 6%<br>AOL 5%<br>AOL 4% |
| Screen View = "Full Message" | Referer or Host | Referer or Host includes a domain equal to any of the following:<br>Gmail.net<br>Virgilio.net |
| Screen View = "Preview Pane" | Referer + Host | Referer includes a (Path equal to:<br>*preview.jsp)<br>AND<br>Host (Or Referer) includes a Domain equal to any of the following:<br>*/earthlink.net<br>*/peoplepc.com |
| Screen View = "Preview Pane" | Referer | Referer includes an Argument equal to:<br>templ=readpane.html |
| Message Forward = "Yes" | Referer | Referer includes an Argument equal to any of the following:<br>Action=forward |
| Message Forward = "Yes" | Referer | Referer includes a Filename equal to any of the following:<br>/compose.aspx<br>/emailItem.jsp |
| Mark as Spam = "Yes" | Referer | Referer includes a Filename equal to any of the following:<br>/blocksender2<br>/SuspectPromptAdd |
| Mark as Safe = "Yes" | Referer | Referer includes an Argument equal to any of the following:<br>Action=addcontactresult<br>Baddcontact=true |

The tracking server 12 records the recipient disposition characteristics data determined through the application of the heuristic rules. The recipient disposition characteristics data is stored in the recipient disposition characteristics database 24 and is also written to files included in the database 24. In addition to determining the recipient disposition characteristics for a particular electronic message, the tracking server 12 also determines the identity of the original sender of the electronic message through the execution of the identity rules. Because the original sender's identity is tracked, the tracking server 12 tracks the recipient disposition characteristics of a particular electronic message delivered to many electronic message recipients. In this regard, an analysis module executed by the tracking server 12 determines tracking statistics for a particular electronic message that is delivered to multiple recipients. Tracking statistics include a percentage of recipients placing the tracked electronic message in a spam folder, a percentage of recipients placing the tracked electronic message in an inbox folder and a percentage of recipients adding the sender of the electronic message to an electronic address box.

Additionally, the recipient disposition characteristics data are input into another process or program to customize the response sent from the tracking server 12 to the electronic message reader 20a-20i in response to the message request. A particular image or webpage is included in the response message based on the tracked recipient disposition characteristic such as the folder location (e.g., a recipient placing the electronic message in an "inbox" folder receives one image and a recipient placing the electronic message in a "spam" folder receives another image.)

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Netscape Navigator, Microsoft Internet Explorer, Mosaic, or Lynx browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware or firmware or combinations thereof. Features implementing functions may also be physically located at various positions, including being distributed such that portions of functions are implemented at different physical locations. It will be understood that various modifications may be made without departing from the spirit and scope of the application.

What is claimed is:

1. A computer-implemented method, comprising:
   receiving, by a tracking computer system separate from an electronic message server and from a client system, a message request in response to an electronic message reader in the client system acting on an electronic message handled by the electronic message server;
   comparing, by the tracking computer system, a field value, within a rule, with a value of a field in the message request; and
   identifying, based upon the comparison, a plurality of recipient disposition characteristics of the electronic message, wherein
   a first one of the identified plurality of recipient disposition characteristics of the electronic message is whether the electronic message was viewed using a preview pane, and
   a second one of the identified plurality of recipient disposition characteristics of the electronic message is whether the electronic message was viewed using a full pane within the electronic message reader.

2. The method of claim 1, wherein the message request comprises one or more of
   a HTTP data message request,
   a HTTP header message request, and
   a HTTP connection data request.

3. The method of claim 1, wherein another of the identified plurality of recipient disposition characteristics includes whether the electronic message was placed into an inbox or a trash folder associated with the electronic message reader.

4. The method of claim 1, wherein another of the identified plurality of recipient disposition characteristics includes whether or not the electronic message was forwarded, from the electronic message server, to a recipient.

5. The method of claim 1, further comprising:
   generating a list of field values associated with fields specifying electronic message recipient disposition characteristics; and
   executing by the computer system one or more rules using field values in the generated list to identify recipient disposition characteristics of the electronic message.

6. The method of claim 1, wherein
   the message request comprises a HTTP request header and
   the field is a folder placement field within the HTTP request header.

7. The method of claim 1, further comprising:
   tracking the identified plurality of recipient disposition characteristics for a specific electronic message;
   generating, by the tracking computer system, a response message based upon the tracked one or more recipient disposition characteristics; and
   sending, by the tracking computer system, the response message to the client system.

8. The method of claim 1, further comprising:
   parsing contents of the request message to identify one or more fields and an associated field value of the one or more fields.

9. The method of claim 1, further comprising comparing the message request with a plurality of rules according to a pre-specified ordering.

10. The method of claim 1, wherein the identified one or more recipient disposition characteristics includes whether or not a sender of the electronic message was identified as a safe sender.

11. A computer-implemented method, comprising:
receiving, by a computer system and from a client system, a message request in response to an electronic message reader in the client system acting on an electronic message;
comparing, by the computer system, a field value, within a rule, with a value of a field in the message request; and
identifying, based upon the comparison, one or more recipient disposition characteristics of the electronic message, wherein
one of the identified one or more recipient disposition characteristics is whether the electronic message was viewed using a preview pane as opposed to the electronic message was viewed using a full pane within the electronic message reader.

12. A computer program product comprising a computer usable storage medium having stored therein computer usable instructions, wherein the computer usable storage medium is not a transitory, propagating signal per se the computer usable instructions, which when executed on a computer tracking hardware system separate from an electronic message server, cause the computer tracking hardware system to perform:
receiving, from a client system, a message request in response to an electronic message reader in the client system acting on an electronic message handled by the electronic message server;
comparing, by the computer system, a field value, within a rule, with a value of a field in the message request; and
identifying, based upon the comparison, a plurality of recipient disposition characteristics of the electronic message, wherein
a first one of the identified plurality of recipient disposition characteristics of the electronic message is whether the electronic message was viewed using a preview pane, and
a second one of the identified plurality of recipient disposition characteristics of the electronic message is whether the electronic message was viewed using a full pane within the electronic message reader.

13. The computer program product of claim 12, wherein the message request comprises one or more of a HTTP data message request, a HTTP header message request, and a HTTP connection data request.

14. The computer program product of claim 12, wherein: another of the identified plurality of recipient disposition characteristics includes whether the electronic message was placed into an inbox or a trash folder associated with the electronic message reader.

15. The computer program product of claim 12, wherein another of the identified plurality of recipient disposition characteristics includes whether or not the electronic message was forwarded, from the electronic message server, to a recipient.

16. The computer program product of claim 12, wherein the computer usable instructions further cause the computer hardware system to perform:
generating a list of field values associated with fields specifying electronic message recipient disposition characteristics; and
executing one or more rules using field values in the generated list to identify recipient disposition characteristics of the electronic message.

17. The computer program product of claim 12, wherein the message request comprises a HTTP request header and the field is a folder placement field within the HTTP request header.

18. The computer program product of claim 12, wherein the computer usable instructions further cause the computer hardware system to perform:
tracking the identified plurality of recipient disposition characteristics for a specific electronic message;
generating a response message based upon the tracked plurality of recipient disposition characteristics; and
sending the response message to the client system.

19. The computer program product of claim 12, wherein the computer usable instructions further cause the computer hardware system to perform:
parsing contents of the request message to identify one or more fields and an associated field value of the one or more fields.

20. The computer program product of claim 12, wherein the computer usable instructions further cause the computer hardware system to perform comparing the message request with a plurality of rules according to a pre-specified ordering.

21. The computer program product of claim 12, wherein another of the identified plurality of recipient disposition characteristics is whether or not a sender of the electronic message was identified as a safe sender.

22. An apparatus comprising:
a tracking server including: a processor; and
a computer usable storage medium having computer usable instructions for causing the processor to perform:
receiving, from a client system, a message request in response to an electronic message reader in the client system acting on an electronic message;
comparing, by the computer system, a field value, within a rule, with a value of a field in the message request; and
identifying, based upon the comparison, a plurality of recipient disposition characteristics of the electronic message, wherein
a first one of the identified plurality of recipient disposition characteristics of the electronic message is whether the electronic message was viewed using a preview pane,
a second one of the identified plurality of recipient disposition characteristics of the electronic message is whether the electronic message was viewed using a full pane within the electronic message reader, and
the tracking server is separate from an electronic message server handling the electronic message.

23. The apparatus of claim 22, wherein
the message request comprises one or more of
a HTTP data message request,
a HTTP header message request, and
a HTTP connection data request.

24. The apparatus of claim 22, wherein: another of the identified plurality of recipient disposition characteristics includes whether the electronic message was placed into an inbox or a trash folder associated with the electronic message reader.

25. The apparatus of claim 22, wherein another of the identified plurality of recipient disposition characteristics includes whether or not the electronic message was forwarded, from the electronic message server, to a recipient.

* * * * *